United States Patent
Henriksen et al.

(10) Patent No.: US 7,099,800 B2
(45) Date of Patent: Aug. 29, 2006

(54) METHOD AND A COMPUTER FOR HANDLING OPERATIONAL DATA OF WIND POWER PLANTS

(75) Inventors: Ulrik Husted Henriksen, Aarhus C. (DK); Nicolaj From Mensberg, Aarhus N. (DK)

(73) Assignee: Neg Micon Control Systems A/S, Hammel (DK)

( * ) Notice: Subject to any disclaimer, the term of this patent is extended or adjusted under 35 U.S.C. 154(b) by 0 days.

(21) Appl. No.: 10/491,107

(22) PCT Filed: Sep. 30, 2002

(86) PCT No.: PCT/DK02/00645

§ 371 (c)(1),
(2), (4) Date: Dec. 16, 2004

(87) PCT Pub. No.: WO03/029648

PCT Pub. Date: Apr. 10, 2003

(65) Prior Publication Data

US 2005/0107989 A1    May 19, 2005

(51) Int. Cl.
*G06F 19/00* (2006.01)
(52) U.S. Cl. ............ 702/187; 702/188; 700/286; 700/290
(58) Field of Classification Search ............ None
See application file for complete search history.

(56) References Cited

U.S. PATENT DOCUMENTS

| | | | | |
|---|---|---|---|---|
| 5,646,343 | A * | 7/1997 | Pritchard | 73/170.08 |
| 6,681,156 | B1 * | 1/2004 | Weiss | 700/291 |
| 6,724,097 | B1 * | 4/2004 | Wobben | 290/44 |
| 6,906,431 | B1 * | 6/2005 | Wobben | 290/44 |
| 6,925,385 | B1 * | 8/2005 | Ghosh et al. | 702/14 |
| 6,966,754 | B1 * | 11/2005 | Wobben | 416/61 |
| 6,975,925 | B1 * | 12/2005 | Barnes et al. | 700/286 |
| 2002/0029097 | A1 * | 3/2002 | Pionzio et al. | 700/286 |
| 2003/0011348 | A1 * | 1/2003 | Lof et al. | 322/37 |
| 2003/0126060 | A1 * | 7/2003 | Lof et al. | 705/36 |
| 2003/0227172 | A1 * | 12/2003 | Erdman et al. | 290/44 |

(Continued)

FOREIGN PATENT DOCUMENTS

DE        19713583        10/1998

(Continued)

OTHER PUBLICATIONS

Scruggs J., "Scada Ensures Consistency, Reduces Costs in Food Processing", I & CS—Industrial and Process Control Magazine, Chilton Company, Radnor, PA, US, vol. 71, No. 6, Jun. 1998 pp. 55-60.

(Continued)

*Primary Examiner*—Patrick J. Assouad
(74) *Attorney, Agent, or Firm*—Harness, Dickey & Pierce, P.L.C.

(57) ABSTRACT

Example embodiments of the present invention relate to a method for collecting data from a wind turbine plant, where data are collected regularly. The collected data made can be stored, where corrections are performed on the stored data. The method also maintains or stores the originally collected data, so that reports may be generated to represent selected data in a plurality of different types of reports. Accordingly, a wind turbine plant may be controlled in relation to originally collected data and in relation to possible correction made to the data.

15 Claims, 2 Drawing Sheets

U.S. PATENT DOCUMENTS

| | | | |
|---|---|---|---|
| 2004/0167677 A1* | 8/2004 | Weiss | 700/291 |
| 2004/0207207 A1* | 10/2004 | Stahlkopf | 290/44 |
| 2004/0230377 A1* | 11/2004 | Ghosh et al. | 702/3 |
| 2004/0267466 A1* | 12/2004 | Enis et al. | 702/60 |
| 2005/0062290 A1* | 3/2005 | Stahlkopf | 290/44 |
| 2005/0090937 A1* | 4/2005 | Moore et al. | 700/286 |
| 2005/0108150 A1* | 5/2005 | Pethick et al. | 705/38 |
| 2005/0127680 A1* | 6/2005 | Lof et al. | 290/44 |
| 2005/0165511 A1* | 7/2005 | Fairlie | 700/286 |
| 2005/0192780 A1* | 9/2005 | Mertins et al. | 703/1 |
| 2005/0192827 A1* | 9/2005 | Mertins et al. | 705/1 |
| 2005/0192859 A1* | 9/2005 | Mertins et al. | 705/10 |
| 2005/0203671 A1* | 9/2005 | Mertins et al. | 700/291 |

FOREIGN PATENT DOCUMENTS

| | | |
|---|---|---|
| WO | WO 9707443 A | 2/1997 |
| WO | WO 0203253 A | 1/2002 |

OTHER PUBLICATIONS

Smith G. J., "Scada In Wind Farms" IEE Colloquium On Instrumentation in the Electrical Supply Industry, IEE London, GB 1993, pp. 11-1-11-2.

Search Report.

* cited by examiner

METHOD AND A COMPUTER FOR HANDLING OPERATIONAL DATA OF WIND POWER PLANTS

The present invention relates to a method and a computer system for receiving and handling operational data from a plurality of wind turbines within a confined area forming a wind power plant.

BACKGROUND OF THE INVENTION

Data from wind power plants are received by a central computer system from the plurality of wind turbines forming the wind power plant as well as from other parts, such as wind anemometers, power output meters etc. with the purpose of surveying the performance and operation of the power plant and for producing reports of the performance. The latter is important as the contracts between manufactures and owners of the power plant usually are based on a set of performance parameters that are evaluated from such reports. The wind turbines report their operational parameters, e.g. power production, pitch angle of the blades, local measured wind speed and direction, temperatures of the generator, power transformer etc., angle of yaw, as well as the operational status, i.e. the categorisation of the time period of the data, such as "normal operation", "yawing", "turning of nacelle to recoil cables", "no contact with power grid", failures of different types etc. In particular, the operational status is important for non-productive periods, so-called downtime because the amount of downtime due to failure of the wind turbines is a significant parameter in computing the performance of the wind power plant. The reporting from the wind turbines is made regularly, typical every 10 minutes, and these data are called raw data.

The quality and completeness of the raw data is normally not satisfactory for direct generation of reports and manipulation of the raw data is performed by overwriting the raw data with corrected data to estimate missing data, correct erroneous data, e.g. values being out of a reasonable range or categorisation data, in particular downtime due to specific causes externally to the power plant. This correction of the raw data is performed as a series of automated routines each correcting for different faults according to a specific method, supplied with a number of manually generated corrections. Thus, the final data from which the reports are generated may typically comprise a considerable amount of data that have been added, altered or corrected one or several times.

Although a copy of the raw data usually is saved as a separate database file, the history of corrections is normally lost and the relation between the measured data and the corrected data may only be resolved by comparing the final data with the raw data.

It has been found by the present inventors that it is advantageous to be able to provide a more detailed substantiation of the corrections made to the raw data in order to generate the performance reports so that the credibility of the report can be estimated. Furthermore, it has also been found to be advantageous to facilitate the generation of different reports in order to evaluate different aspects of the performance and operation of the wind power plant, e.g. for optimisation of different aspects of the operational parameters, for identifying the importance of various reasons for downtime and for evaluation of the plant performance according to a set of contractual rules.

A separate log of the corrections may be kept and a backtracking of each of the final data by means of the log may be applied to generate each of the different reports and the substantiation of the corrections. However, this procedure is tedious and requires many calculations and database lookups, particularly for the large amounts of data originating from large wind power plants over long time periods of several months or even years. The request for generation of different reports based on different corrections or priority of the corrections may necessitate that a separate series of corrections starting from the raw data is performed for each of the reports.

SUMMARY OF THE INVENTION

Thus, the objective problem to be solved by the present invention is to provide a method and a computer system for collecting raw data from a plurality of units, including a plurality of wind turbines, of a wind power plant, correcting the raw data with a plurality of routines and generating a plurality of reports, in which said generation of the plurality of reports based on different combinations of said correcting routines is facilitated.

This problem is solved by means of the present invention by preserving all the collected, raw data as well as all automatically generated and manually generated correction data in the same data structure, typically a two-dimensional matrix for each turbine, in which each column represents a data type, such as, e.g., time, measured production, reported operational status, production estimated from wind speed, production estimated from neighbouring wind turbines, automatically corrected operational status, manually corrected operational status, etc. and each row represents a period of a length, typically 10 minutes, occurring at a specified time and date. The data structure may also be, or be regarded as, a three-dimensional structure of which the two dimensions are as described and the third dimension represents the plurality of wind turbines so that each wind turbine has one two-dimensional data layer for its own data.

This solution requires much larger data storage means that the known solutions, but it is thereby achieved that all different kinds of requested reports may easily be generated from the data, for which reports the priority of selecting data on which to base the report is diverging, e.g. whether to use the production estimated from wind speed or the production estimated from neighbouring wind turbines if the operational data for a wind turbine are missing for a period. Furthermore, it is easy to substantiate the type and amount of corrections on which a given report is based.

Example embodiments of the present invention provide a method of collecting and correcting operational data from a wind power plant by a computer device, comprising the steps of regularly receiving operational data from a plurality of wind turbine of said wind power plant, storing said operational data in a dedicated part of a dimensionally ordered data structure in a data storage device associated with the computer device, performing a plurality of predefined correction routines each producing a set of correction data, storing said sets of correction data in thereto dedicated parts of said data structure in said data storage means so that all previous stored data are preserved, and generating reports of a plurality of types, each type having a predefined set of rules for selecting data from said stored data on which selected data the report type is based.

By the term "dimensionally ordered data structure" is understood e.g. a two-dimensional matrix of data, of which the rows represent periods and the columns represent data, or a three-dimensional matrix of data, of which the third dimension represents the plurality of wind turbines so that each turbine has its dedicated two-dimensional data layer. More dimensions, e.g. representing subgroups of wind turbines would also be within the scope of the present invention.

It is important that all stored data are preserved, which means that data when stored may not overwrite previously stored data of the data structure.

The operational data comprises typically at least the power production and the operational status of the wind turbine, but other data such as temperatures of various parts of the turbines, yawing angle, wind speed etc. may also form part of the operational data.

It is preferred that at least one of the correction routines produces a set of correction data being estimated data for the power production of the wind turbines.

Furthermore, the method may in a preferred embodiment furthermore comprise means for allowing manual correction of the data. Thus, the method may further comprise the steps of activating a user input routine that allows for manual user input of correction instructions, receiving user input of correction instructions from a user interface, generating at least on set of manual correction data from said correction instructions, and storing said sets of manual correction data in thereto dedicated parts of said data structure in said data storage means so that all previous stored data are preserved.

It is furthermore advantageous that at least one of said reports comprises credibility data based on the type and/or amount of corrections of the selected data from which the report is generated.

The present invention relates in a further aspect to a computer system comprising means for establishing at least temporarily data transmission connection with a plurality of wind turbines forming a wind power plant and having means for performing the above method as well as a computer programme product that is suitable for being run on a computer system comprising means for establishing at least temporarily data transmission connection with a plurality of wind turbines forming a wind power plant and enable said computer system to perform the method of the present invention.

BRIEF DESCRIPTION OF THE DRAWINGS

The present invention will become more apparent by describing in detail example embodiments thereof with reference to the drawing in which.

DETAILED DESCRIPTION OF EXAMPLE EMBODIMENTS OF THE INVENTION

Figure 1:
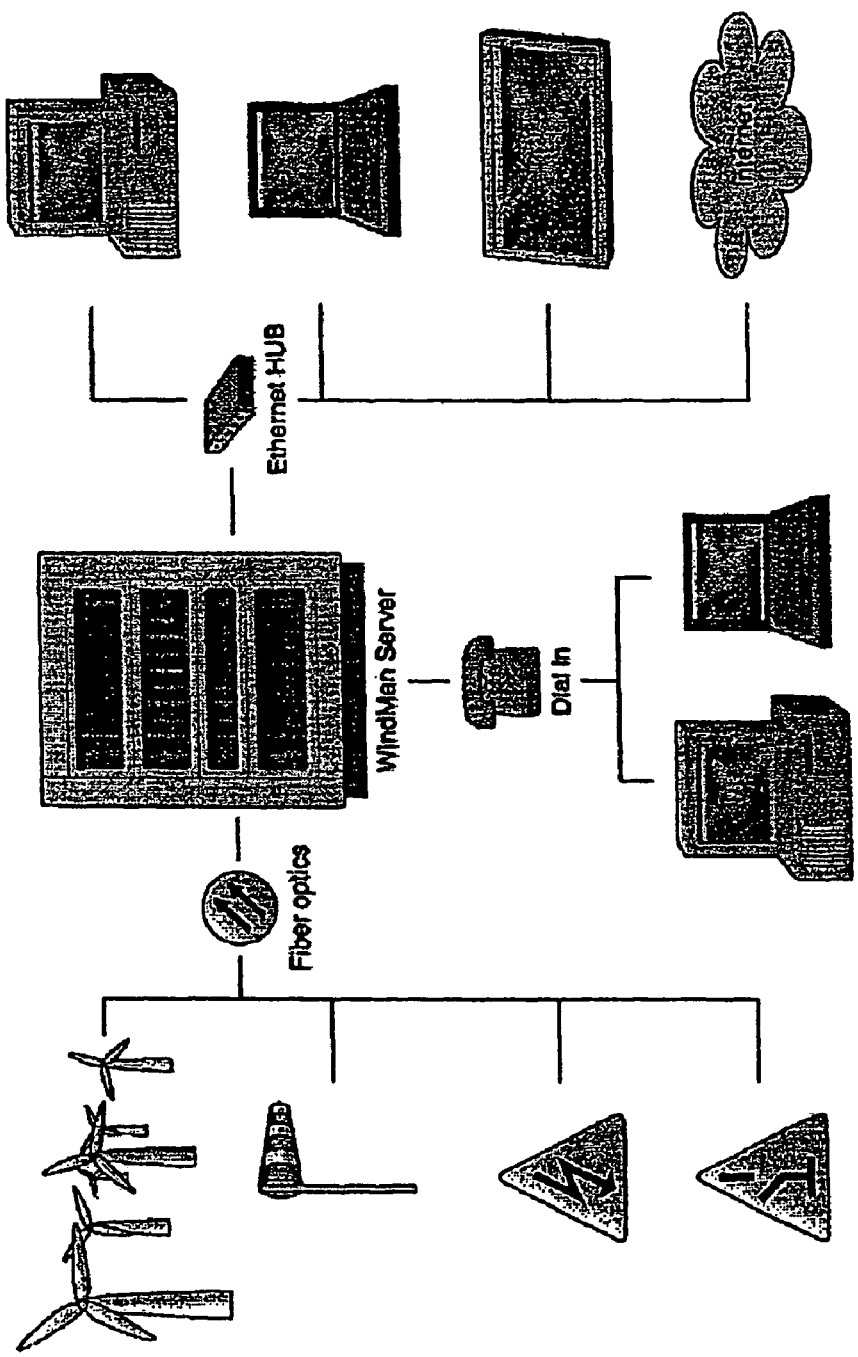
FIG. 1 is a schematic drawing of a system for receiving and handling data from a plurality of wind turbine in accordance with an example embodiment of the present invention.
Figure 2:
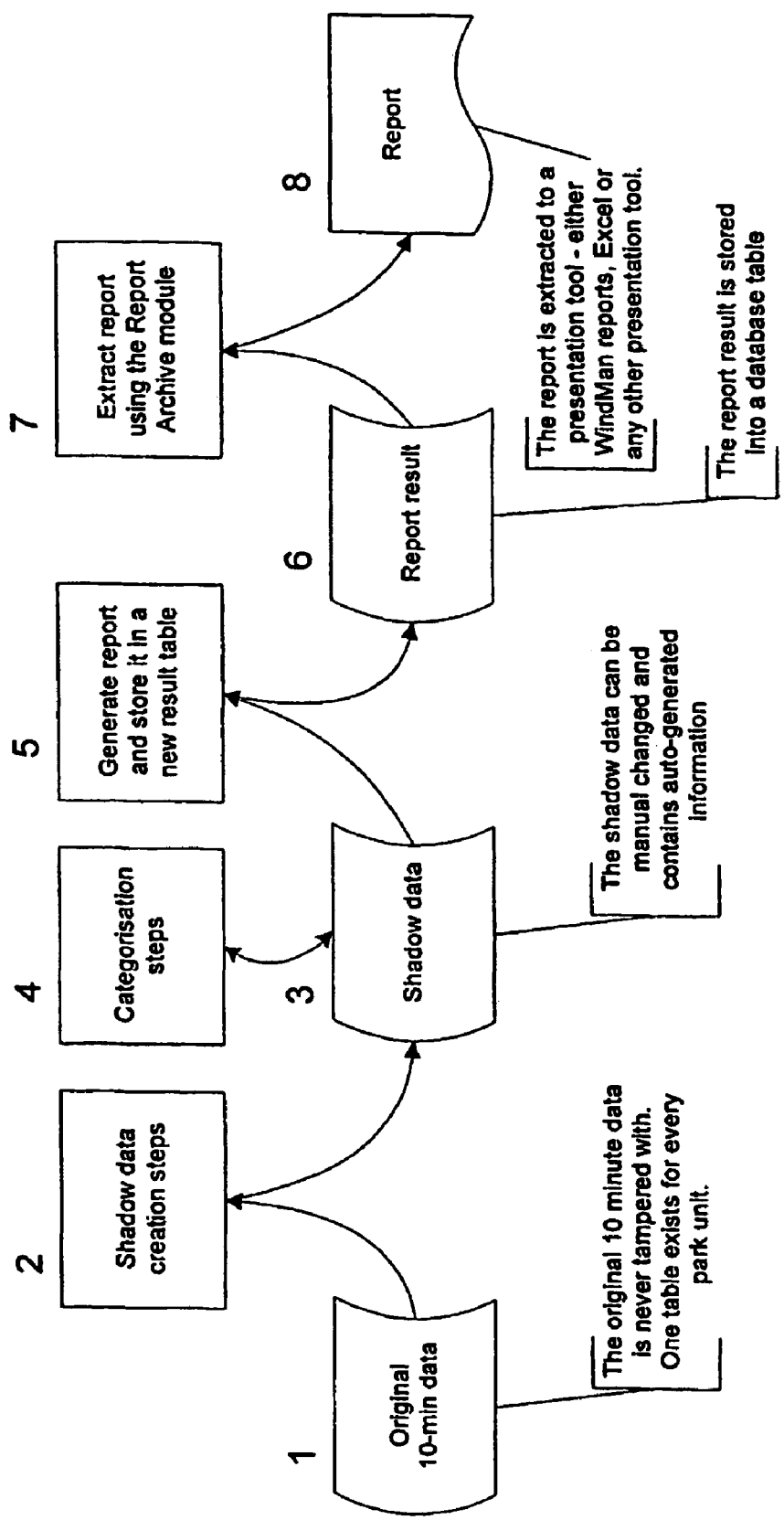
FIG. 2 is a flow chart illustrating a method for collecting and correcting operational data from a wind power plant by a computer device in accordance with an example embodiment of the present invention.

A preferred embodiment of the present invention is disclosed in the following with reference to the accompanying drawings of which FIG. 1 is an overview of the wind power plant and the server infrastructure of the computer system and FIG. 2 is a flow chart of the data processing performed in the computer system.

The Server Solution according to an embodiment of the present invention is a SCADA system used for wind power plants. A wind power plant consists of wind turbines, meteorology stations, substations and a control building. All units in at the power plant are loop connected through fibre optical cables that meet up in the control building. In the control building a Small Business Server is installed with dedicated software for operation, monitoring and collection of historical data from the power plant.

All communication at the control building between Server and the Clients is performed through a LAN, but is also possible to connect to the server from a remote location through a dial-in connection (RAS-modem)

The Report Generator toolbox is a software product of the computer system and consists of following components:

Report generator
  For everyone who can generate a new report
Report archive
  For everyone who can access generated reports
Shadow data editor
  For on-site operators who is responsible for downtime allocation, shadow-data integrity.
Profile administrator
  For the administrator who is responsible for the configuration of the system. This include event-list allocation, calculation and raw data validation parameters To be able to make report with maximum data integrity an automatic and manual processing of the raw data is executed. Beside validation of the collected data a number of different new values are calculated as well.

The following steps describes the work flow in using the Report Generator with reference to FIG. 2:

Step 1

All collected raw data from the turbines and other park units are store in a Windows SQL2000 database.

Step 2, 3 & 4

The shadow data tables consist of data generated based on raw data and contractual parameters entered into the configuration table in the Profile Administrator module. The calculated new values are focusing on Expected Production used to estimate the complete power plant performance.

Another very important set op values are the automatic and manual allocation of downtime. These values are use for documenting the contractual availability.

All the raw and processed data are in general used for verifying the performance of the power plant and by that the contractual responsibilities. This makes the data processing subject to extensive focus and high level of data transparency is required.

To meet the demand for data transparency, the software uses different ways of keeping an overview. The main features are:

Colour coding to separate the manipulated data from the raw data.

Raw data is always read-only, which means that raw data never is lost and always can be presented.

The system uses data priority instead of overwriting raw data.

e.g. The highest priority is always used for the reports: Manual entered data, then auto-generated and finally raw data. (Separate data table for each data set)

All contractual presented data have associated data integrity reports.

When allocating downtime it is possible to add comments to all auto-generated and manually edited allocations on a 10-minute resolution.

The contractual profile can be locked including all performance setting, contractual power curves and contractual availability settings. A contractual profile cannot be edited without the consent of all contractual parties.

Step 5 & 6

When data have been validated and manual edited the reports can be generated, presented and stored as a table in the database.

Step 7 & 8

All generated reports/results are stored the Report Achieve where everybody with the right access can download and print the reports. It is also possible to regenerate the individual report if the edited shadow data have been change further.

The invention claimed is:

1. A method of collecting and correcting operational data from a wind power plant by a computer device, comprising the steps of:
    regularly receiving operational data from a plurality of wind turbine of said wind power plant,
    storing said operational data in a dedicated part of a dimensionally ordered data structure in a data storage device associated with the computer device,
    performing a plurality of predefined correction routines each producing a set of correction data,
    storing said sets of correction data in thereto dedicated parts of said data structure in said data storage device so that all previous stored data are preserved, and
    generating reports of a plurality of types, each type having a predefined set of rules for selecting data from said stored data on which selected data the report type is based.

2. A method according to claim 1, wherein the operational data comprises at least the power production and the operational status of the wind turbine.

3. A method according to claim 1, wherein at least one of the correction routines produces a set of correction data being estimated data for the power production of the wind turbines.

4. A method according to claim 1, further comprising the steps of:
    activating a user input routine that allows for manual user input of correction instructions,
    receiving user input of correction instructions from a user interface,
    generating at least on set of manual correction data from said correction instructions, and
    storing said sets of manual correction data in thereto dedicated parts of said data structure in said data storage device so that all previous stored data are preserved.

5. A method according to claim 1, wherein at least one of said reports comprises credibility data based on the type and/or amount of corrections of the selected data from which the report is generated.

6. A computer system comprising a device for establishing at least temporarily data transmission connection with a plurality of wind turbines forming a wind power plant and having means for performing the method of claim 1.

7. A computer program product that is suitable for being run on a computer system comprising a device for establishing at least temporarily data transmission connection with a plurality of wind turbines forming a wind power plant and enable said computer system to perform the method of claim 1.

8. A computer system comprising a device for establishing at least temporarily data transmission connection with a plurality of wind turbines forming a wind power plant and having means for performing the method of claim 2.

9. A computer system comprising a device for establishing at least temporarily data transmission connection with a plurality of wind turbines forming a wind power plant and having means for performing the method of claim 3.

10. A computer system comprising a device for establishing at least temporarily data transmission connection with a plurality of wind turbines forming a wind power plant and having means for performing the method of claim 4.

11. A computer system comprising a device for establishing at least temporarily data transmission connection with a plurality of wind turbines forming a wind power plant and having means for performing the method of claim 5.

12. A computer program product that is suitable for being run on a computer system comprising a device for establishing at least temporarily data transmission connection with a plurality of wind turbines forming a wind power plant and enable said computer system to perform the method of claim 2.

13. A computer program product that is suitable for being run on a computer system comprising a device for establishing at least temporarily data transmission connection with a plurality of wind turbines forming a wind power plant and enable said computer system to perform the method of claim 3.

14. A computer program product that is suitable for being run on a computer system comprising a device for establishing at least temporarily data transmission connection with a plurality of wind turbines forming a wind power plant and enable said computer system to perform the method of claim 4.

15. A computer program product that is suitable for being run on a computer system comprising a device for establishing at least temporarily data transmission connection with a plurality of wind turbines forming a wind power plant and enable said computer system to perform the method of claim 5.

* * * * *